United States Patent [11] 3,592,484

| [72] | Inventor | Harold J. Burke |
| | | Saginaw, Mich. |
| [21] | Appl. No. | 880,782 |
| [22] | Filed | Nov. 28, 1969 |
| [45] | Patented | July 13, 1971 |
| [73] | Assignee | General Motors Corporation |
| | | Detroit, Mich. |

[54] FIXED VANE ROTOR-TYPE PUMP ASSEMBLY
6 Claims, 6 Drawing Figs.

[52] U.S. Cl. ............................................. 280/124,
267/34, 267/65
[51] Int. Cl. ....................................... B60g 11/26
[50] Field of Search .......................... 280/124 F,
6 H; 267/34, 65

[56] References Cited
UNITED STATES PATENTS

| 3,285,617 | 11/1966 | Jackson ...................... | 267/34 X |
| 3,331,599 | 7/1967 | Polhemus ................... | 267/34 |

*Primary Examiner*—Philip Goodman
*Attorneys*—William S. Pettigrew and John C. Evans ABSTRACT: In preferred form, a hydraulic pump for an automotive self-leveling suspension system having a generally cylindrical semiannular rotor within a cylinder in the pump housing. A generally sector-shaped chamber bounded by the semiannular rotor and the pump housing is divided into dual compression chambers by a stationary vane extending from the pump housing toward the rotor. Relative movement between the sprung and unsprung masses of the associated vehicle pivots an arm connected to a shaft which oscillates the rotor within the pump housing. Inlet and outlet valves direct fluid flow from a reservoir into the compression chambers and hence to hydraulic cylinders at the vehicle's rear suspension. A normally closed dump valve between the hydraulic cylinders and the reservoir is opened to depressurize the cylinders and resultantly level the vehicle in response to the relative spacing between the vehicle's sprung and unsprung masses. A cammed surface on the pump shaft actuates the dump valve.

INVENTOR.
Harold J. Burke
BY
J. C. Evans
ATTORNEY

INVENTOR.
Harold J. Burke
BY
J. C. Evans
ATTORNEY

FIXED VANE ROTOR-TYPE PUMP ASSEMBLY

This invention relates to an automotive self-leveling suspension system and more particularly to a hydraulic pump having an automatic level-sensing dump valve.

Level control is desirable to maintain a predetermined distance between the sprung mass and the unsprung mass of the automobile under varying load conditions. Normally, supplemental suspension is required only at the rear wheels. The subject self-leveling system utilizes expandable hydraulic cylinders placed between the rear suspension springs and the vehicle frame. A hydraulic pump affixed to the vehicle frame powers the cylinders and is operably connected to an actuating arm which is pivoted in response to relative movement between the sprung and unsprung masses of the vehicle. The actuating arm oscillates an interconnected shaft and rotor within the pump to pressurize the hydraulic cylinders. This maintains a predetermined distance between the sprung mass of the vehicle and the unsprung mass.

More particularly, the subject hydraulic pump houses an oscillatory semiannular cylindrical rotor within a cylinder. A stationary vane extends from the pump housing into a sector-shaped chamber formed by the semiannular rotor and the walls of the cylinder. Dual compression chambers are formed on either side of the vane and pump hydraulic fluid as the rotor oscillates. Inlet and outlet valves in the pump direct the fluid into and out of the compression chambers.

A cammed surface on the pump shaft opens a normally closed dump valve when the actuating arm pivots the shaft a predetermined angular distance from a central position. When opened, the dump valve depressurizes the hydraulic cylinders by opening a passage into a reservoir attached to the hydraulic pump. Alternate pressurization and depressurization of the cylinders maintains a predetermined distance between the sprung mass and the unsprung mass of the vehicle.

Therefore, an object of the inventor in the present invention is to provide a self-leveling system for automobiles including a hydraulic pump housing a semiannular cylindrical rotor which is oscillated within the pump by an interconnected shaft and arm pivotal in response to relative movement between the sprung mass and the unsprung mass of the vehicle.

A still further object of the inventor in the present invention is the provision of a self-leveling system for automobiles including a hydraulic pump housing a semiannular cylindrical rotor which is oscillated within the pump by an interconnected shaft and arm and having a normally closed dump valve between the pump outlet and inlet which opens in response to angular movement of the arm and the shaft to depressurize hydraulic cylinders placed between the rear springs and the vehicle frame.

Further objects and advantages of the present invention will be apparent from the following description, reference being had to the accompanying drawings wherein a preferred embodiment of the present invention is clearly shown.

Figure 1:
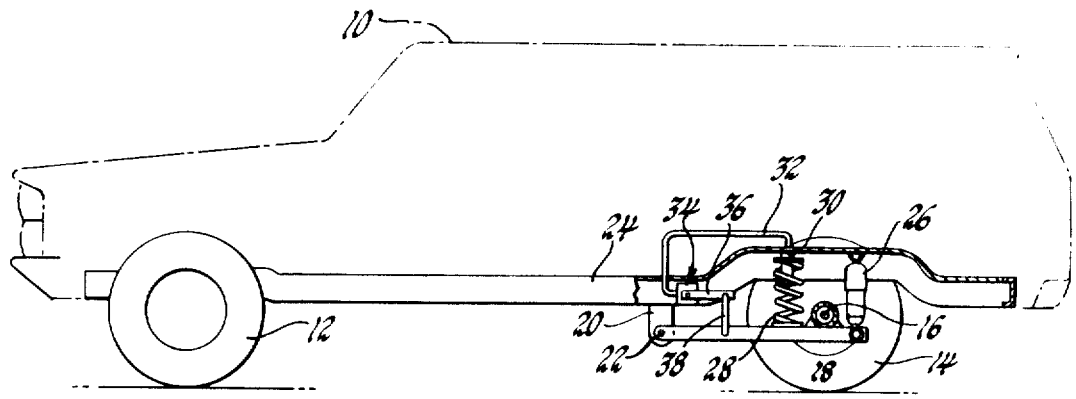
FIG. 1 is a phantom view in side elevation of a vehicle with components of the self-leveling system including the hydraulic pump of the present invention.
Figure 2:
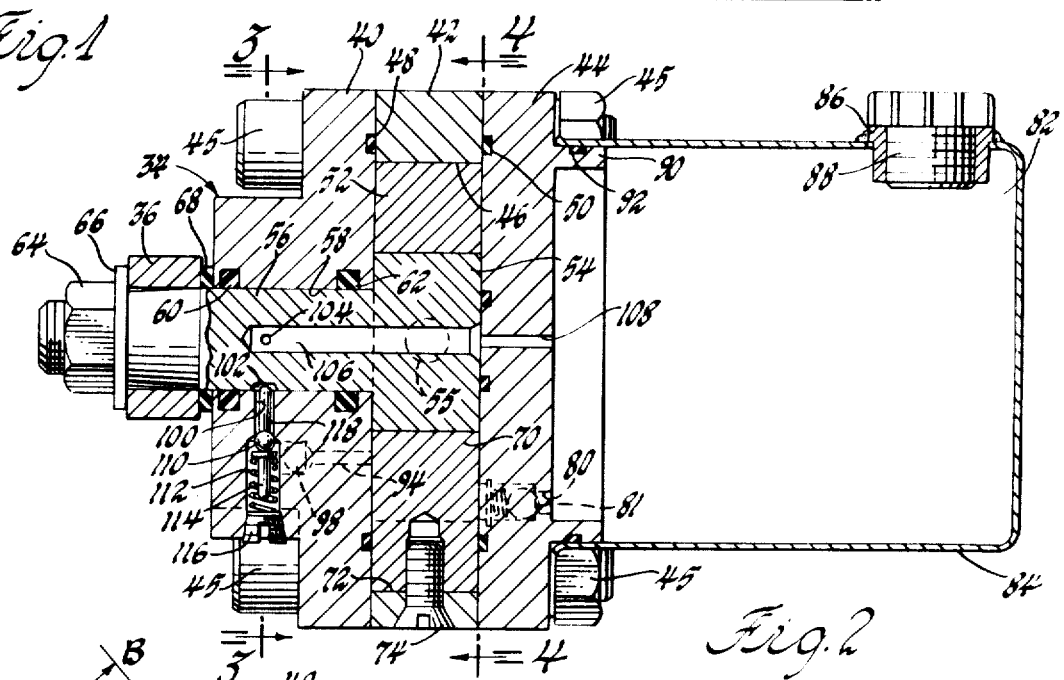
FIG. 2 is a vertical sectioned view of the pump shown in FIG. 1.

In FIG. 1 of the drawings, an automobile 10 is illustrated. The automobile 10 includes rear wheels 12 and rear wheels 14 (only one of each is shown). An axle 16 extends between the rear wheels 14 and is attached to a control arm 18 which is pivoted by a bracket 20 on a pin 22. Bracket 20 is affixed to the automobile frame 24. A conventional hydraulic shock absorber 26 is attached at an upper end to the frame 24 and at a lower end to the control arm 18. The shock absorber 26 dampens relative movement between the frame 24 which is the sprung mass of the automobile and the wheel-supporting axle 16 which is the unsprung mass of the automobile.

The frame 24 of the automobile 10 is supported with respect to the control arm 18 by a rear suspension spring 28 (only one side of the rear suspension is shown). Spring 28 is affixed at its lower end to the control arm 18 and is connected to a hydraulic cylinder 30 at its upper end. As weight is added to the rear of the automobile 10, frame 24 tends to move downward with respect to control arm 18. This downward force causes coil spring 28 to decrease in length.

A predetermined spacing between control arm 18 and frame 24 is desirable. By increasing the pressure in the hydraulic cylinder 30 this spacing is maintained. The pressure extends the cylinder 30 and compensates for a shortening of the springs 28 due to the added weight. For a more detailed explanation of the hydraulic cylinder 30 shown in FIG. 1, reference is made to U.S. Pat. No. 2,927,801 to G. W. Jackson issued Mar. 8, 1960.

Hydraulic pressure is transmitted to cylinder 30 through a line 32 from a hydraulic pump assembly 34. Pump 34 is affixed to the frame 24 of the automobile and has an arm 36 which is operably connected by a link 38 to control arm 18 for pivotal movement therewith.

Figure 4:
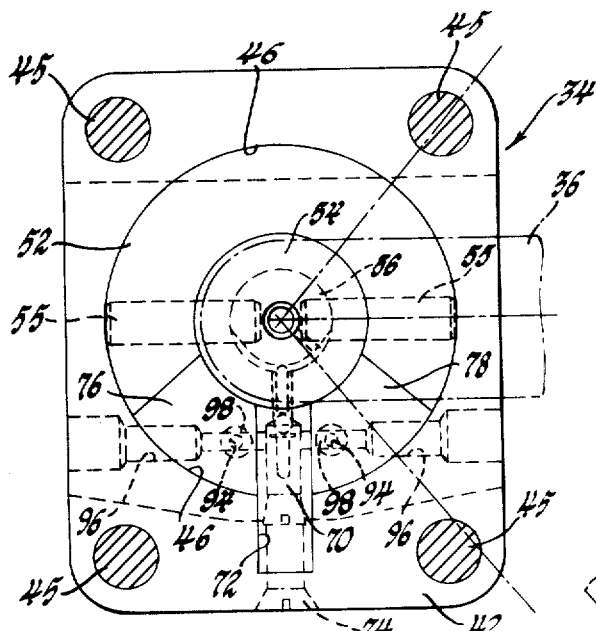
FIG. 4 is a sectioned view taken along section line 4—4 of FIG. 2 and looking in the direction of the arrows.

The pump 34 includes a front cover plate 40, a ring plate 42, and a rear cover plate 44. Plates 40, 42 and 44 are secured together by bolt and nut fasteners 45 to form the pump housing. Ring plate 42 has a central hole therethrough which forms a cylinder chamber 46 between the front cover plate 40 and the back cover plate 44. O-ring gaskets 48 and 50 between plates 40, 42 and 44 prevent hydraulic fluid leakage from the chamber 46. A semiannular cylindrical rotor 52, as best seen in FIG. 4, is supported within cylindrical chamber 46. The diameters of the rotor 52 and the cylindrical chamber 46 are very nearly equal to permit the rotor 52 to oscillate within the chamber without substantial fluid leakage therebetween.

The rotor 52 is affixed to an enlarged portion 54 of a rotatable shaft 56 by pins 55 and both are supported within a bore 58 in the plate 40. O-rings 60 and 62 encircle shaft 56 to prevent fluid leakage from chamber 46. The arm 36 is attached to a tapered end of shaft 56 which extends from the plate 40 by a fastener 64 and a washer 66. A flexible washer 68 is located between arm 36 and plate 40. Arm 36 is keyed to shaft 56 to prevent relative angular movement therebetween.

The semiannular rotor 52 is a disc-shaped cylindrical member with a central hole to engage the enlarged portion 54 of shaft 56. An angular portion or sector of the rotor is missing. The walls of cylinder 46 and the semiannular rotor 52 form a generally sector-shaped chamber between plate 40 and plate 44 as best shown in FIG. 4. A stationary vane 70 is retained in a channel 72 in the ring plate 42 by a screw 74. The vane 70 extends toward portion 54 of shaft 56 and divides the aforementioned sector-shaped chamber into dual compression chamber 76 and 78.

Movement of the control arm 18 with respect to frame 24 of the automobile pivots the arm 36 by line 38. Movement of arm 36 oscillates shaft 56 and the attached rotor 52 within the pump 34. The oscillation of rotor 52 alternately pressurizes fluid in the two compression chambers 76 and 78 and pumps fluid to the cylinders located at the rear springs.

More particularly, hydraulic fluid is drawn into the compression chambers 76 and 78 through two inlet ports 80 in the rear cover plate 44. Spring-biased check valves 81 prevent fluid flow from the chambers 76 and 78 into reservoir 82. Inlet ports 80 extend from chambers 76 and 78 into a reservoir 82 formed by a cup-shaped cylindrical tank 84 attached to plate 44. Fluid is added to reservoir 82 through a filler opening 86 which is normally closed by a cap 88. An open end of tank 84 engages an outwardly projecting annular flange 90 on the back cover plate 44 and is held against the plate 44 by the bolt and nut fasteners 45. An O-ring 92 between the tank 84 and flange 90 prevents fluid leakage therebetween.

Oscillation of rotor 52 alternately pressurizes hydraulic fluid in compression chamber 76 and 78. The fluid flows from the chambers 76 and 78 through outlet ports 94 into an outlet passage 96 in plate 40. Passage 96 is connected to hydraulic fluid lines 32 which transmit fluid pressure to the hydraulic cylinders 30 located at the rear suspension springs 28. Spring-biased check valves 98 in ports 94 prevent the flow of fluid from passage 96 back into the compression chambers 76 and 78.

Figure 3:
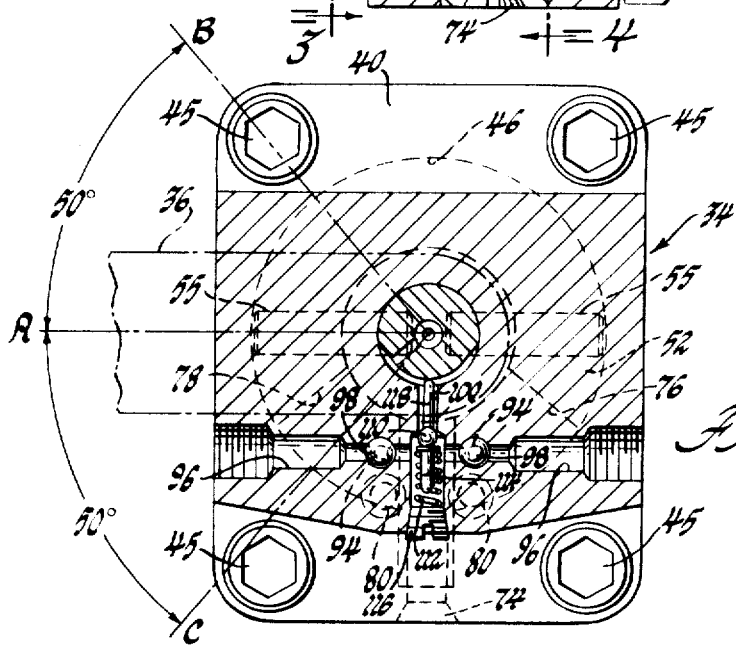
FIG. 3 is a sectioned view taken along section line 3—3 of FIG. 2 and looking in the direction of the arrows.

Hydraulic fluid is returned to reservoir chamber 82 by pressure releasing means in response to predetermined angular movement of arm 36 from its central position A to either of positions B or C shown in FIG. 3. The pressure-releasing means includes a relief passage 100 in plate 40 which extends from outlet passage 96 to bore 58 in plate 40. A semiannular groove 102 in the surface of shaft 56 extends from the relief passage 100 to a radially directed bore 104 in the shaft 56. Bore 104 intersects an axial passage 106 in the center of shaft 56 which extends to back cover plate 44 and joins a passage 108 through plate 44 and into reservoir chamber 82.

A spring-biased dump valve normally blocks the relief passage 100 to prevent fluid flow through relief passage 100, groove 102, bore 104, passage 106 and passage 108 into the reservoir chamber. In the preferred embodiment, a ball valve element 110 normally blocks passage 100. Spring 112 and plunger 114 hold the ball valve 110 into a normally closed position. A plug 116 engages the bottom of spring 112.

Figure 5:
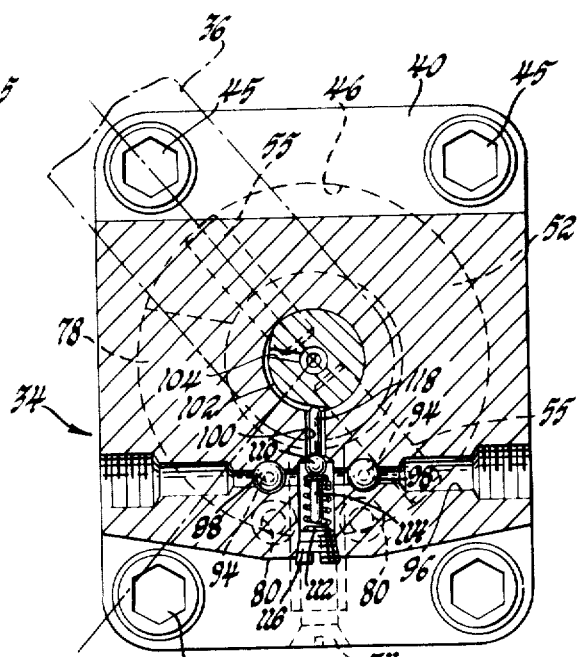
FIG. 5 is a view similar to FIG. 3 with the pump rotor in an angular position opening the dump valve.
Figure 6:
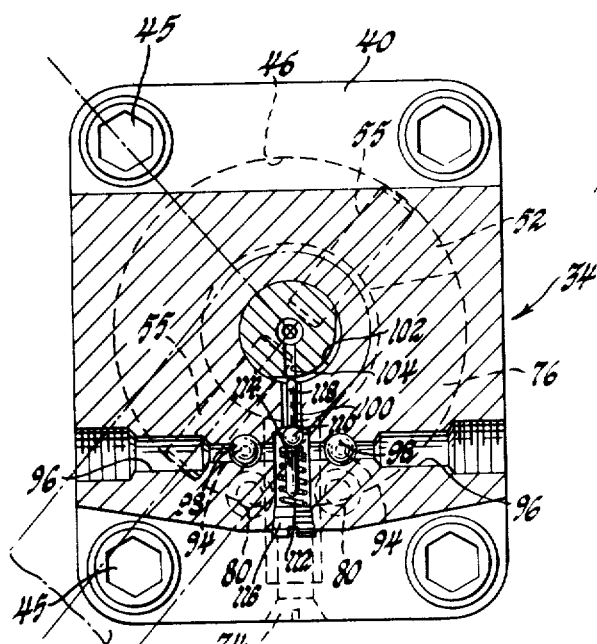
FIG. 6 is a view similar to FIG. 5 with the pump rotor in an angular position opening the dump valve.

As arm 36 is pivoted a predetermined 50° angle from its central position A to a position B or a position C (shown in FIGS. 5 and 6 respectively), the radially outwardly tapered ends of groove 102 bias a valve pin 118 downward to open dump valve 110. With arm 36 in either position B or position C, pressure is relieved in hydraulic cylinders 30 by fluid flow past the dump valve 110 and through passage 100, groove 102, bore 104 and passages 106, 108 into the reservoir chamber 82. Cyclic depressurization of cylinders 30 in response to movement of arm 36 into extreme positions B and C, causes the hydraulic cylinders 30 to be maintained at a desirable elongation to effect proper vehicle leveling.

In tests on a prototype hydraulic pump, pressures as great as 1000 p.s.i. were readily attainable. In the pump tested, a 2.5-inch diameter rotor approximately 0.765 inches in thickness was oscillated in a pump cylinder of approximately the same diameter. The diameter of the enlarged portion of the shaft is about 1.25 inches and the thickness of the vane is about 0.375 inches. An annular portion of about 100° is absent from the rotor. The compression chamber capacity therefore is approximately 0.755 cubic inches.

A desirable feature of the present pump which greatly contributes to its pressure-generating capacity is the good seal between the two compression chambers. This sealing is attributal to the particular arrangement in which a movable rotor oscillates with respect to a fixed vane. Pressure leakage between cylinders only occurs between the rotor and the cylinder and between the end of the vane and the shaft. The former fluid path is restricted by the close fit and the large circumference of the rotor. The latter fluid path is restricted by a close fit which is made possible because of the stationary mounting of the vane.

It should be understood that the thickness of the rotor, vane and ring may be increased or decreased to vary pump characteristics. Decreasing the thickness will lighten the actuating arm effort while increasing the thickness will increase pump capacity.

While the embodiment of the present invention as herein described constitutes a preferred form, it is to be understood that other forms may be adapted.

What I claim is as follows:

1. A hydraulic pump assembly for use in an automotive self-leveling system having sprung and unsprung masses suspended with respect to one another by coil springs and hydraulic cylinders in series comprising: a pump housing enclosing a cylindrical chamber; a semiannular cylindrical rotor in said cylindrical chamber; said semiannular rotor and the walls of said cylindrical chamber defining a sector-shaped chamber; a shaft with one end attached to said rotor for rotation together and with a second end projecting from said housing; a vane affixed to said pump housing dividing said sector-shaped chamber into variable volume compression chambers; a reservoir fluidly connected to said housing for storing fluid; inlet means from said reservoir to said compression chambers; inlet valves for blocking fluid flow from said compression chambers; outlet means from said compression chambers to the hydraulic cylinders; outlet valves for blocking fluid flow into said compression chambers; an actuating arm affixed to said second end of said shaft for rotation together; said pump housing and said actuating arm operably connected between the sprung and unsprung masses of the vehicle to cause pivotal movement of said arm and resultant oscillation of said interconnected shaft and rotor with respect to said pump housing in response to movement between the sprung and unsprung masses; means between said outlet means and said reservoir for releasing pressurized fluid from the hydraulic cylinders into said reservoir in response to a predetermined angular movement of said arm from a central position; and whereby relative movement between the sprung mass and the unsprung mass pivots said arm which oscillates said rotor within said cylindrical chamber to pressurize fluid within said compression chambers.

2. A hydraulic pump assembly for use in an automotive self-leveling system having sprung and unsprung masses suspended with respect to one another by coil springs and hydraulic cylinders in series comprising: a pump housing enclosing a cylindrical chamber; a semiannular cylinder rotor in said cylindrical chamber, said semiannular rotor and the walls of said cylindrical chamber defining a sector-shaped chamber; a shaft with one end attached to said rotor for rotation together and with a second end projecting from said housing; a vane affixed to said pump housing dividing said sector-shaped chamber into variable volume compression chambers; a reservoir fluidly connected to said housing for storing fluid; means from said reservoir to said compression chambers; inlet valves for blocking fluid flow from said compression chambers; outlet means from said compression chambers to the hydraulic cylinders; outlet valves for blocking fluid flow into said compression chambers; an actuating arm affixed to said second end of said shaft for rotation together; said pump housing and said actuating arm operably connected between the sprung and unsprung masses of the vehicle to cause pivotal movement of said arm and resultant oscillation of said interconnected shaft and rotor with respect to said pump housing in response to movement between the sprung and unsprung masses; means between said outlet means and said reservoir for releasing pressurized fluid from the hydraulic cylinders into said reservoir in response to a predetermined angular movement of said arm from a central position; said pressure release means including a normally closed dump valve which blocks fluid flow to said reservoir; cam means on said shaft for opening said dump valve when said arm and connected shaft are rotated a predetermined angular distance from the normal central position; and whereby relative movement between the sprung mass and the unsprung mass pivots said arm which oscillates said rotor within said cylindrical chamber to pressurize fluid within said compression chambers.

3. A pump assembly as set forth in claim 2, wherein said dump valve includes a ball valve element normally seated into a closed position by a spring to block fluid flow from the hydraulic cylinders to said reservoir; a valve pin extending from said cam means to said ball valve element opens said dump valve in response to movement of said shaft.

4. A pump assembly as set forth in claim 2, wherein said cam means includes a semiannular groove in said shaft; said groove having opposite ends tapering radially outward toward the surface of the shaft.

5. A pump assembly as set forth in claim 2, wherein said pressure release means includes a semiannular groove in said shaft fluidly connected to said dump valve; a passage through said shaft including a radially directed bore fluidly connected to said groove and a centered axially directed passage fluidly connected to said bore; and a passage in said pump housing fluidly connected to said axial passage and said reservoir.

6. The pump assembly as set forth in claim 2, wherein a cup-shaped tank is affixed to said pump housing; said pump housing enclosing one end of said tank to form said reservoir.